US009607002B2

(12) United States Patent
Schmidt et al.

(10) Patent No.: US 9,607,002 B2
(45) Date of Patent: Mar. 28, 2017

(54) FILE RETRIEVAL FROM MULTIPLE STORAGE LOCATIONS

(71) Applicant: INTEL CORPORATION, Santa Clara, CA (US)

(72) Inventors: Johannes P. Schmidt, Los Altos Hills, CA (US); Kevin Shen, Sunnyvale, CA (US); James Bailey, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 382 days.

(21) Appl. No.: 14/133,480

(22) Filed: Dec. 18, 2013

(65) Prior Publication Data

US 2015/0169620 A1   Jun. 18, 2015

(51) Int. Cl.
*G06F 7/00*   (2006.01)
*G06F 17/30*   (2006.01)

(52) U.S. Cl.
CPC ............... *G06F 17/30194* (2013.01)

(58) Field of Classification Search
CPC ...................... G06F 17/30861; H04N 21/4622
USPC ........................................................ 707/827
See application file for complete search history.

(56) References Cited

U.S. PATENT DOCUMENTS

| | | | | |
|---|---|---|---|---|
| 5,900,883 A * | 5/1999 | Crucs | ................... | G06T 1/00 345/418 |
| 8,626,876 B1 * | 1/2014 | Kokal | ................... | H04L 67/06 709/203 |
| 8,965,939 B2 * | 2/2015 | Leggette | ............. | G06F 21/6218 707/825 |
| 2003/0046270 A1 * | 3/2003 | Leung | ............... | G06F 17/30575 |
| 2006/0095470 A1 * | 5/2006 | Cochran | ........... | G06F 17/30067 |
| 2006/0149806 A1 * | 7/2006 | Scott | ................ | G06F 17/30067 709/201 |
| 2006/0195512 A1 * | 8/2006 | Rogers | ............. | G06F 17/30766 709/203 |
| 2007/0263984 A1 * | 11/2007 | Sterner | ............... | G11B 27/034 386/234 |
| 2008/0005027 A1 * | 1/2008 | Mullins | ................... | G06F 21/10 705/51 |
| 2008/0126357 A1 * | 5/2008 | Casanova | ......... | G06F 17/30215 |
| 2009/0235267 A1 * | 9/2009 | McKinney | ........... | G06F 11/328 718/104 |

(Continued)

*Primary Examiner* — Binh V Ho
(74) *Attorney, Agent, or Firm* — Schwabe, Williamson & Wyatt, P.C.

(57) ABSTRACT

In embodiments, apparatuses, methods and storage media are described that are associated with retrieval of a file stored at multiple storage locations, such as a content file. A file retrieving device may receive an identifier of multiple storage locations from which a file may be downloaded, including content delivery networks and distinct storage servers at a particular content delivery network. The decoder may retrieve portions of the file from the different indicated storage locations. The file retrieving device may be configured to assign portion sizes to various storage locations based on a history of bandwidth experienced from the various storage locations. The file retrieving device may be configured to dynamically manage retrieval of portions of the file from the multiple storage locations, such as by re-assigning a slow or stalled portion from one storage location to a faster or underutilized storage locations. Other embodiments may be described and claimed.

24 Claims, 7 Drawing Sheets

(56) References Cited

U.S. PATENT DOCUMENTS

| | | | | |
|---|---|---|---|---|
| 2010/0312670 A1* | 12/2010 | Dempsey | ............... | G06Q 30/02 |
| | | | | 705/27.2 |
| 2010/0312899 A1* | 12/2010 | Herzog | ................ | H04L 67/141 |
| | | | | 709/228 |
| 2012/0084386 A1* | 4/2012 | Fu | ........................ | G06F 9/5072 |
| | | | | 709/214 |
| 2013/0254248 A1* | 9/2013 | Chang | ................... | H04L 67/101 |
| | | | | 707/827 |
| 2013/0322329 A1* | 12/2013 | Visuri | ................... | H04W 48/16 |
| | | | | 370/328 |
| 2014/0059156 A1* | 2/2014 | Freeman, II | ............ | H04L 67/10 |
| | | | | 709/213 |
| 2014/0089359 A1* | 3/2014 | Leong | ............... | G06F 17/30073 |
| | | | | 707/827 |

* cited by examiner

FILE RETRIEVAL FROM MULTIPLE STORAGE LOCATIONS

TECHNICAL FIELD

The present disclosure relates to the field of data processing, in particular, to apparatuses, methods and systems associated with retrieval of files.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Files, and in particular files of media content, are often retrieved from online storage sites prior to consumption. For example, in various video streaming techniques, small files containing segments of video may be downloaded by a content consumption device from online storage locations. In various techniques, segment files (or other files) may be stored in identical form at multiple locations such that the content consumption device may have multiple options for retrieval of segment files. These storage locations may include content delivery networks, which may include multiple servers configured to provide files, and/or specific servers. However, due to various factors, such as load, network traffic, distance, infrastructure interruptions, etc., different online storage locations may provide different retrieval performance experiences for a content consumption device. These differing performance experiences may make it difficult for the content consumption device to smoothly retrieve and present streamed or downloadable content.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Embodiments described herein are directed to, for example, methods, computer-readable media, and apparatuses associated with retrieval of a file stored at multiple storage locations, such as a content file. In various embodiments, a file retrieving device, such as a content consumption device, may receive an identifier of multiple storage locations from which a file may be downloaded. In various embodiments, the multiple storage locations may include various storage locations, including content delivery networks, and distinct storage servers at a particular content delivery network. The decoder may be configured to then retrieve portions of the file from the different indicated storage locations. In various embodiments, the file retrieving device may be configured to assign portion sizes to various storage locations based on a history of bandwidth experienced from the various storage locations. In various embodiments, the file retrieving device may be configured to dynamically manage retrieval of portions of the file from the multiple storage locations, such as by re-assigning a slow or stalled portion from one storage location to a faster or underutilized storage locations. Other embodiments and implementation details are described herein.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
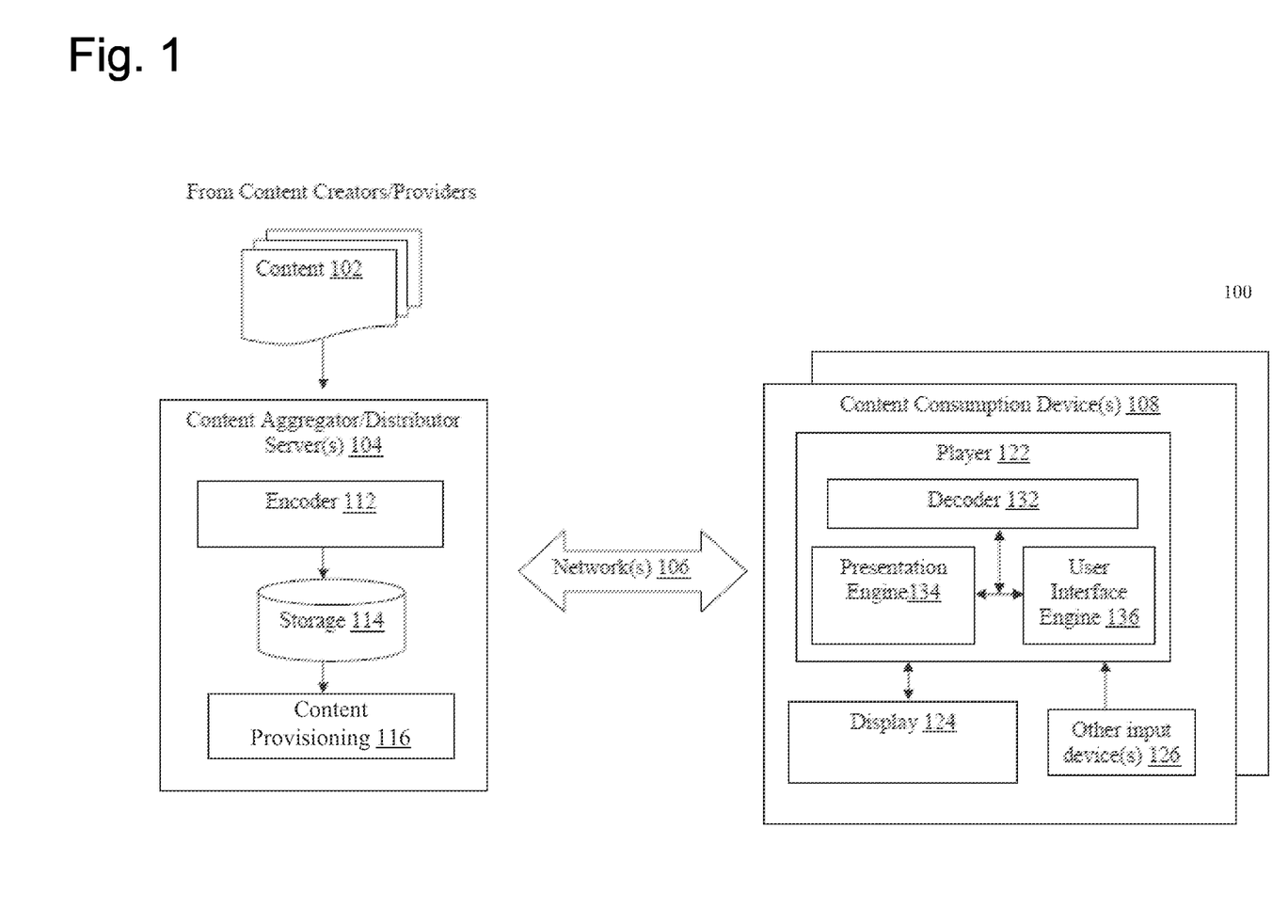
FIG. 1 illustrates an example arrangement for content distribution and consumption, in accordance with various embodiments.

Referring now to FIG. 1, an arrangement 100 for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106. In other embodiments, different arrangements, devices, and/or systems maybe used.

In embodiments, as shown, content aggregator/distributor servers 104 may include encoder 112, storage 114 and content provisioning 116, which may be coupled to each other as shown. Encoder 112 may be configured to encode content 102 from various content creators and/or providers 101, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files, portions of files, and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats.

In various embodiments, content aggregator/distributor servers 104 may not include the encoder 112 but may still include the storage 114 and/or the content provisioning 116. In various embodiments, the content aggregator/distributor servers 104 may include one more servers which may be separately addressable and/or may be configured to separately provide encoded content. In various embodiments, content provisioning 116 may be configured to perform processing and/or manipulation of content stored at storage 114, while in other embodiments, content provisioning 116 may provide content without manipulation, such as by simply replying to requests for content with content data.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device(s) 126. Player 122 may be configured to receive streamed content, decode and recover the content from the content stream, and present the recovered content on display 124, in response to user selections/inputs from user input device(s) 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control (such as described below), gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Figure 2:
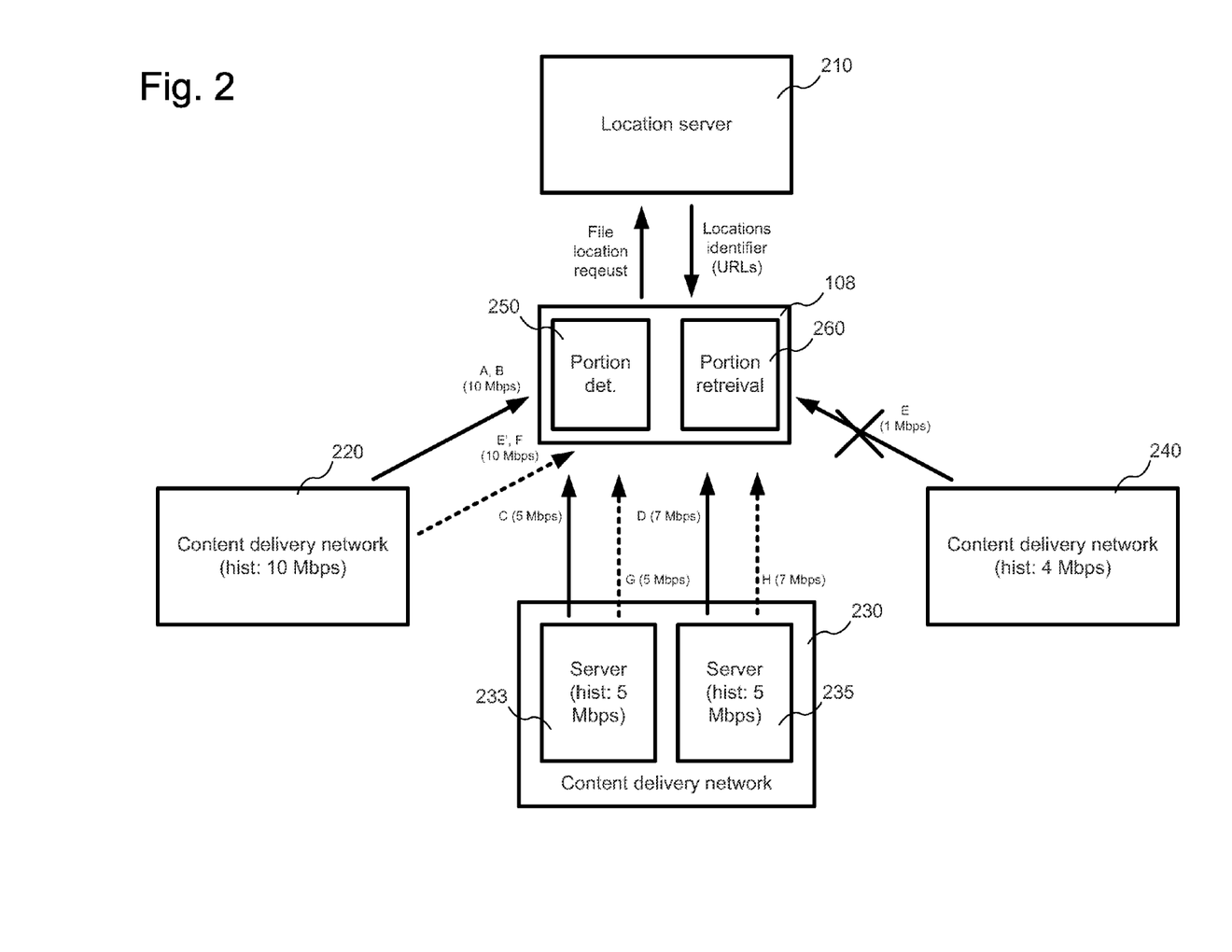
FIG. 2. illustrates an example arrangement of various entities and information flows for performing file retrieval from multiple storage locations, in accordance with various embodiments.

Referring now to FIG. 2, an example arrangement 200 of various entities and information flows for performing file retrieval from multiple storage locations is illustrated in accordance with various embodiments. In various embodiments, the content consumption device 108 ("CCD 108") may interact with a location server 210, as well as various storage locations, such as, for example, content delivery networks 220, 230, and 240 ("CDNs 220, 230, and 240") and/or servers 233 and 235, to retrieve a file from the various storage locations, such as by retrieving portions of the file from the various CDNs. In various embodiments, the CCD 108 may include one or more modules to facilitate retrieval of portions of the file, such as portion determination module 250 ("PD 250") and portion retrieval module 260 ("PR 260"). In some embodiments, the PD 250 and PR 260 may be included in another module of the CCDD 108, such as, for example, the decoder 132. In various embodiments, the various entities illustrated in FIG. 2 may operate to facilitate retrieval of a content file, such as a video, image, or audio file. Particular examples of operations and interactions between these entities is described in greater detail below.

In various embodiments, the CCD 108, and specifically the PD 250, may be configured to send a request for storage locations for a file to the location server 210. In various embodiments, an address for the location server 210 may be known to the content consumption device 108 prior to the content consumption device 108 attempting to retrieve a file. The location server 210 may be configured to respond to the request with an identifier of one or more storage locations where the file may be retrieved from. In various embodiments, the response may include one or more URLs, or other identifiers, of the one or more storage locations.

In various embodiments, the one or more storage locations may include one or more content delivery networks, such as the illustrated content delivery networks 220 and 240. In various embodiments, the one or more storage locations may include specific servers where the file may be retrieved from, such as servers 233 and 235 in content delivery network 230. In some embodiments, received identifiers of the one or more locations may include locations that are not specific servers, but are rather locations of content delivery networks, from which traffic may be redirected to one or more specific servers. In other embodiments, multiple connections may be made to a single storage location. Use of multiple connections to a single location may provide a benefit when connections are dropped, or when one storage location is particularly robust at responding to content requests.

In various embodiments, the portion determination module 250 of the content consumption device 108 may be configured to determine one or more portions of the file to retrieve from respective storage locations. In various embodiments, these portions may be determined based on historical data, such as historical bandwidth data. In various embodiments historical bandwidth data (or other performance data) may be maintained by the PD 250. In other embodiments, historical bandwidth data (or other performance data) may be received from the location server 210 and/or other entities, such as in the response sent by the location server 210 to the request for storage locations send by the PD 250. In various embodiments, the portions may be determined such that they are substantively proportional to the historical bandwidth data. In various embodiments, the PR 260 of the CCD 108 may be configured to perform retrieval of the determined portions of the file from the various storage locations.

An example may be illustrated with reference to FIG. 2. In the example, the PD 250 has determined portions A-H of the file to retrieve, which, for the sake of illustration, are determined with substantively equal portion sizes. In an initial determination, the PD 250 has determined to retrieve portions A and B from the CDN 220, which has had a historical bandwidth performance of 10 Mbps, while it has determined to retrieve portions C and D from servers 233 and 235 respectively which have histories of performing at 5 Mbps, and portion E from CDN 240, which has a history of performing at 4 Mbps. The initial retrievals based on these determinations are illustrated in FIG. 2 with solid-line arrows.

The PR 250 may also be configured to re-assign retrieval of the portions of the file based on performance during retrieval. In various embodiments this re-assignment may be performed based on slow performance of a storage location, such as a CDN or server that is experiencing low bandwidth during retrieval. In various embodiments, this re-assignment may be performed based on an underutilized storage location, such as a CDN or server that has become idle (with respect to the PR 260) while other (possibly slower) storage locations are being used for portion retrieval. In various embodiments, these re-assignments may be performed, for a storage location, after retrieval has completed for another, currently-retrieved portion.

Returning to the example of FIG. 2, portions A & B are retrieved at a rate of 10 Mbps, while portions C and D are retrieved at rates of 5 and 7 Mbps, respectively. However, CDN 240 is exhibiting a bandwidth of only 1 Mbps. Thus, the PR 260 may elect to cancel retrieval from the CDN 240 and to re-assign that retrieval to the CDN 220, which has exhibited the must faster 10 Mbps performance. Thus, for the remaining portions, CDN 220 may be used for retrieval of portions E and F (after retrieval of portions A and B), while servers 233 and 235 may be used for the remaining portions G and H. These later-in-time retrievals are shown with the dotted-line arrows of FIG. 2. In various embodiments, the PR 260 may re-assign part of a re-assigned portion, such as when the portion has been partially retrieved. Thus, in the example of FIG. 2, CDN 220 may be used for a part of portion E, indicated as portion E'. Portion E' may include data from portion E that was not retrieved from CDN 240 prior to cancellation of retrieval from CDN 240.

Figure 3:
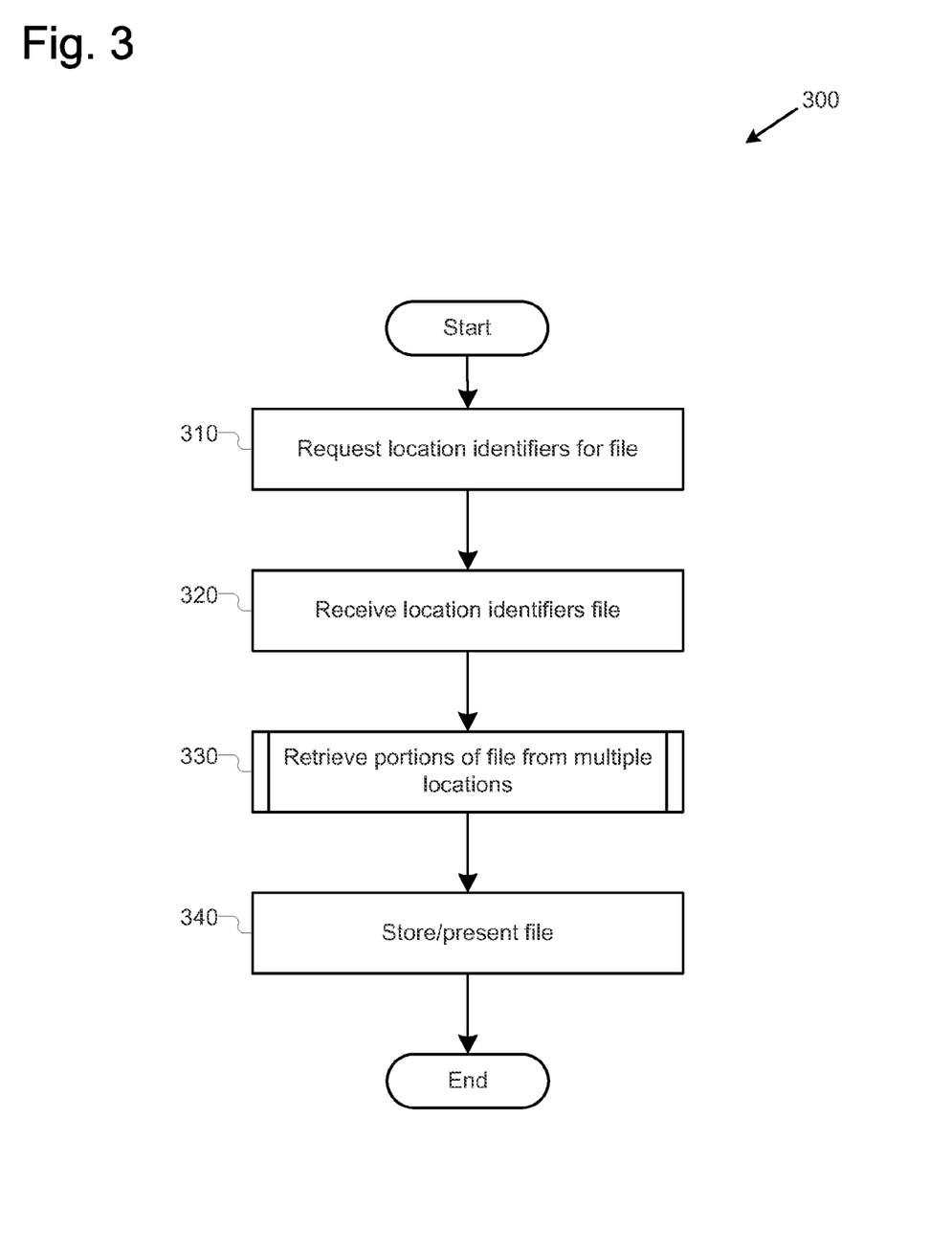
FIG. 3 illustrates an example process for retrieving files from multiple storage locations, in accordance with various embodiments.

Referring now to FIG. 3, illustrates an example process 300 for retrieving files from multiple storage locations in accordance with various embodiments. While FIG. 3 illustrates particular example operations for process 300, in various embodiments, process 300 may include additional operations, omit illustrated operations, and/or combine illustrated operations. In various embodiments, the actions of process 200 may be performed by the CCD 108, such as by the PD 250 and the PR 260. The process may begin at operation 310, where the PD 250 may request video location identifiers for a file from the location server 210. Next, at operation 320, the PD 250 may receive one or more location identifiers for the file from the location server 210. Next, at operation 330, the CCD 108 may retrieve portions of the file from multiple storage locations. In various embodiments, operation 330 may be performed by the PD 250 and PR 260, as described below. Particular example embodiments of operation 330 are described below with reference to process 400 of FIG. 4. Next, at operation 340, the PR 250 may store or present the file. In various embodiments, at operation 340, the PR 250 may store the file as portions are retrieved, or may store the file as a complete entity after receipt of all portions of the file. In another embodiment, the file may be presented, such as for streaming content. This presentation may occur, in various embodiments, as portions are received, or after the entire file is received. After operation 340, the process may end.

Figure 4:
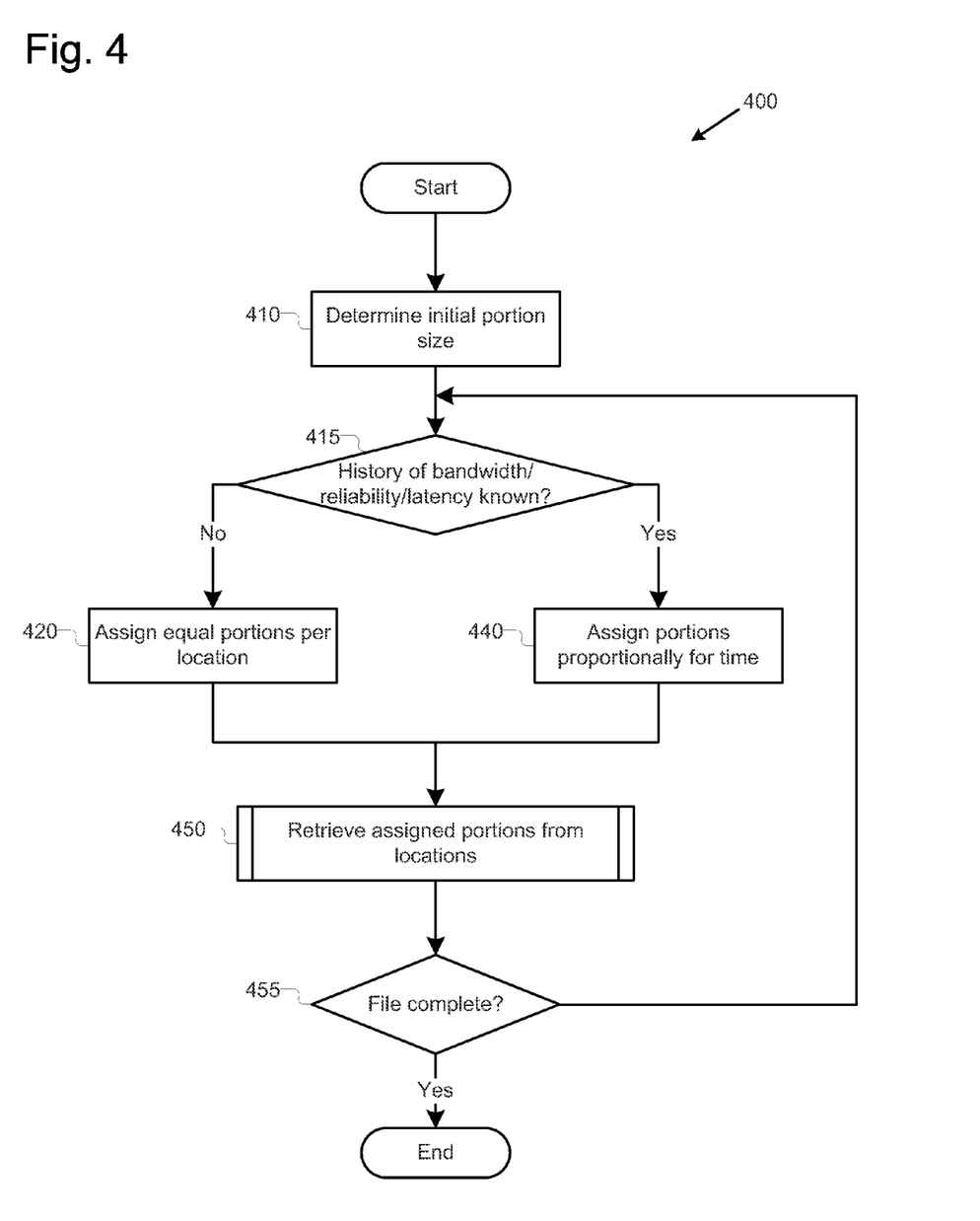
FIG. 4 illustrates an example process for retrieving a file from multiple storage locations, in accordance with various embodiments.

Referring now to FIG. 4, an example process 400 for retrieving a file from multiple storage locations is illustrated in accordance with various embodiments. While FIG. 4 illustrates particular example operations for process 400, in various embodiments, process 400 may include additional operations, omit illustrated operations, and/or combine illustrated operations. In various embodiments, process 400 may be performed to implement operation 330 of process 300 of FIG. 3. In various embodiments, process 400 may be performed by the PD 250 and/or the PR 260.

The process may begin at operation 410, where the PD 250 may determine an initial portion size. In various embodiments the PD 250 may determine a portion size that is small enough to provide for later re-assignment but which may not be so small that it requires many connections to be made to many storage locations. Next, at decision operation 415, the PD 250 may determine whether a history of bandwidth, of connection reliability, and/or of connection latency is known for the various storage locations identified during process 300. In various embodiments, as mentioned above, the PD 250 may receive indications of bandwidth history for the storage locations from the location server. In other embodiments, the PD 250 may maintain its own stored indications of bandwidth history for the one or more storage locations.

If the PD 250 determines that it does not have a history information for the storage locations, then, at operation 420, the PD 250 may assign equal portions to each location from which the PR 260 may be retrieving data. In various embodiments, the PD 250 may assign one or more portions per storage location; these portions may be queued by the PR 260 during subsequent retrieval. If, however, the PD 250 determines that it does have history information for the storage locations, then at operation 440, the PD 250 may assign portions of the file proportionally according to determined retrieval times. Thus, for a location that may be assumed, based on historical bandwidth data, to have twice the bandwidth as a second storage location, twice the number of portions may be retrieved. In various embodiments, rather than assign different numbers of equal-sized portions, in some embodiments, different-sized portions may be assigned at operation 440. In various embodiments, history of connection reliability and/or connection latency may also be considered when assigning portions.

Next, at operation 450, the PR 260 may retrieve the assigned portions from the one or more storage locations. Particular example embodiments of operation 450 are described below with reference to process 500 of FIG. 5. Next, at decision operation 455, after the assigned portions are retrieved, the PD 250 may determine whether the file has been completely retrieved. If not, then the process may repeat, such as at decision operation 415. If, the file is complete, however, the process may end.

Figure 5:
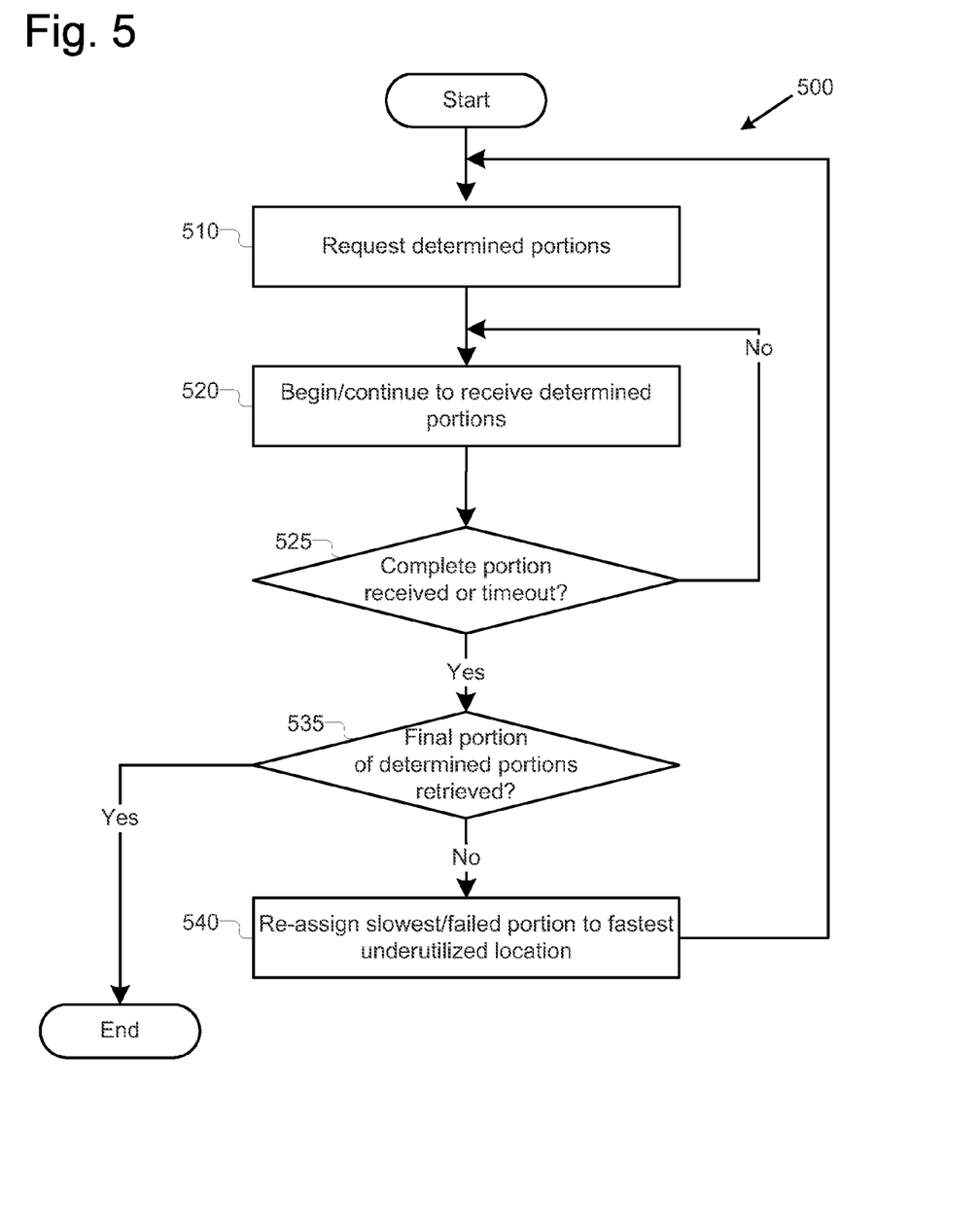
FIG. 5 illustrates an example arrangement for retrieving portions of a file from multiple storage locations, in accordance with various embodiments.

Referring now to FIG. 5, an example process 500 for retrieving portions of a file from multiple storage locations is illustrated, in accordance with various embodiments. While FIG. 5 illustrates particular example operations for process 500, in various embodiments, process 500 may include additional operations, omit illustrated operations, and/or combine illustrated operations. In various embodiments, process 500 may be performed to implement operation 450 of process 400 of FIG. 4. In various embodiments, process 500 may be performed by the PD 250 and the PR 260.

The process may begin at operation 510, where the PR 250 may request the determined portions from the one or more storage locations. Next, at operation 520, the PR 260 may begin to retrieve the determined portions, or continue to retrieve the determined portions if retrieval is ongoing. In various embodiments, during retrieval, at decision operation 525, the PR 260 may determine if a portion is complete or if a request has timed out. If not, then the process may repeat at operation 520, where the PR 260 may continue to retrieve portions of the file.

If, however, a portion has been completely retrieved or a request for a portion has timed out, then at decision operation 535, the PR 260 may determine if the final portion of the determined portions has been retrieved. If not, then at operation 540, the PD 250 may re-assign a slowest or failed portion from the storage location to which it was previously assigned to a fastest underutilized storage location. In other embodiments, the re-assignment may be performed based on criteria other than speed, such as stability of connection, and or cost considerations. If, however, at decision operation 535 the PR 260 determines that the final portion has been retrieved, the process may end.

Figure 6:
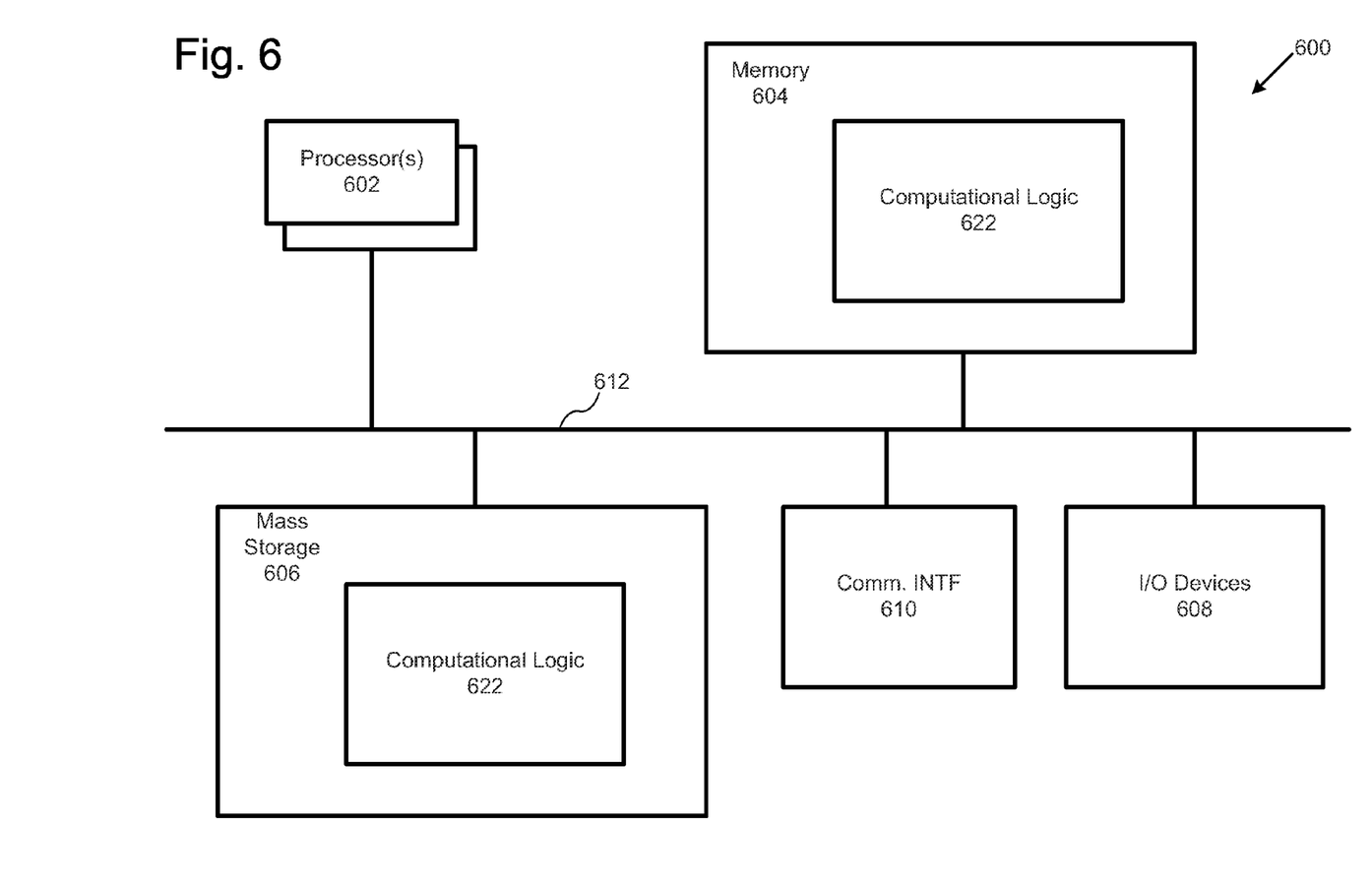
FIG. 6 illustrates an example computing environment suitable for practicing various aspects of the present disclosure, in accordance with various embodiments.

Referring now to FIG. 6, an example computer suitable for practicing various aspects of the present disclosure, including processes of FIGS. 3-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth).

The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with content consumption device 108, e.g., operations associated with file retrieval from multiple storage locations such as shown in FIGS. 3-5. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content aggregator/distributor server 104 or a content consumption device 108 (e.g., a player 122). Their constitutions are otherwise known, and accordingly will not be further described.

Figure 7:
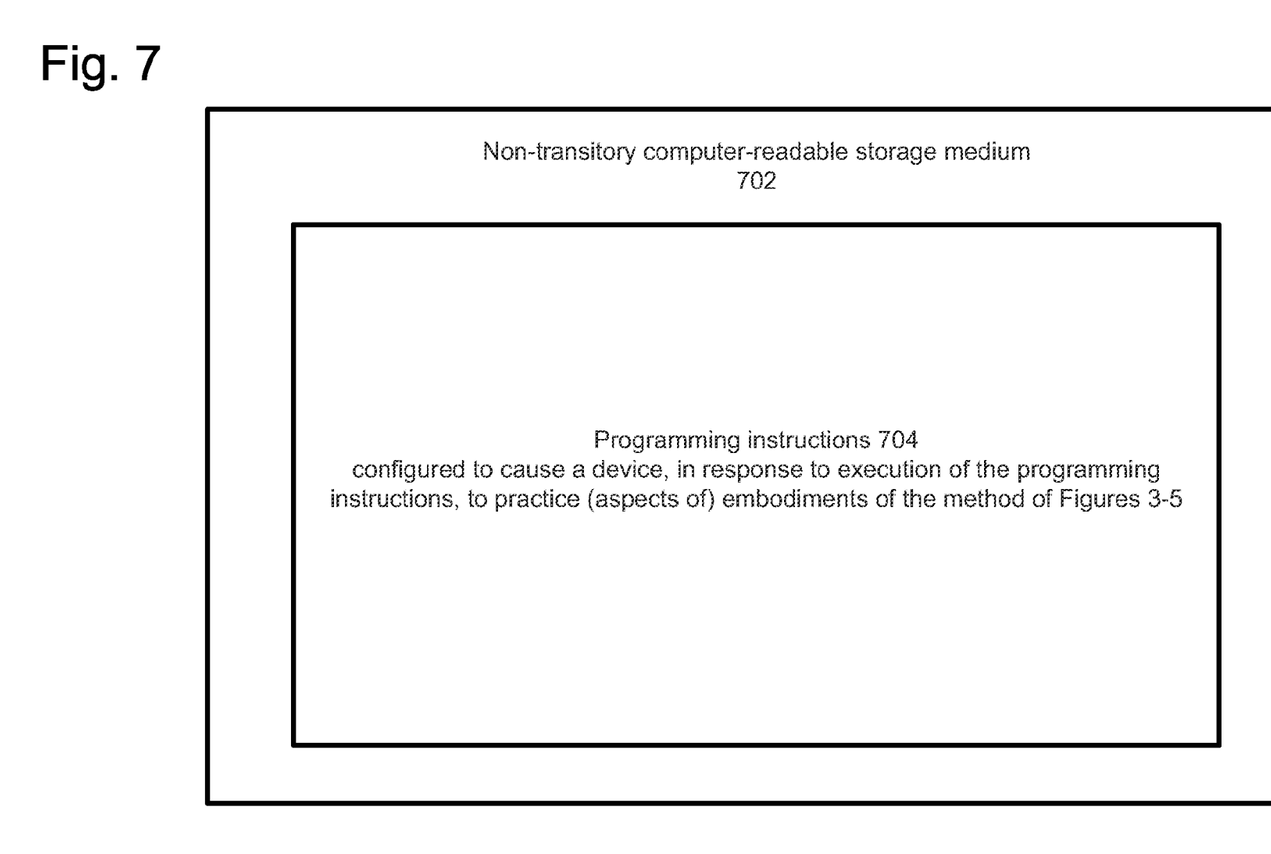
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with content consumption device 108, e.g., operations associated with retrieval of files from multiple storage locations, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 3-5, e.g., but not limited to, to the various operations performed to perform retrieval of files. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 3-5. For one embodiment, at least one of processors 602 may be packaged together with computational logic 622 configured to practice aspects of processes of FIGS. 3-5 to form a System in Package (SiP). For one embodiment, at least one of processors 602 may be integrated on the same die with computational logic 622 configured to practice aspects of processes of FIGS. 3-5. For one embodiment, at least one of processors 602 may be packaged together with computational logic 622 configured to practice aspects of processes of FIGS. 3-5 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 includes one or more computer-readable storage media including a plurality of instructions to cause one or more computing devices, in response to execution of the instructions by the computing device, to facilitate retrieval of a file stored at multiple storage locations. The computing device may be caused to receive an identifier of multiple storage locations from which a file can be retrieved, each of the multiple storage locations to store a copy of the file; determine, for respective storage locations, respective portions of the file to retrieve; and retrieve the respective portions of the file from the multiple storage locations.

Example 2 includes the computer-readable storage media of example 1, wherein the multiple storage locations include multiple content delivery networks.

Example 3 includes the computer-readable storage media of example 1, wherein the multiple storage locations include multiple servers at a single content delivery network.

Example 4 includes the computer-readable storage media of example 1, wherein the multiple storage locations include connections to a single storage location.

Example 5 includes the computer-readable storage media of example 1, wherein receive an identifier of multiple storage locations includes receive an identifier including multiple uniform resource locators for the multiple storage locations.

Example 6 includes the computer-readable storage media of example 1, wherein determine, for respective storage locations, respective portions of the file to retrieve includes determine equally-sized portions of the file.

Example 7 includes the computer-readable storage media of any of examples 1-6, wherein determine, for respective storage locations, respective portions of the file to retrieve includes determine portions of the file based at least in part on a history of bandwidth observed for the multiple storage locations.

Example 8 includes the computer-readable storage media of example 7, wherein determine portions of the file based at least in part on a history of bandwidth observed for the multiple storage locations includes determine the sizes for the portions that are proportional to the bandwidth observed for the multiple storage locations.

Example 9 includes the computer-readable storage media of any of examples 1-6, wherein determine, for respective storage locations, respective portions of the file to retrieve includes determine portions of the file based at least in part on connection reliability observed during retrieval from the respective storage locations.

Example 10 includes the computer-readable storage media of any of examples 1-6, wherein determine, for respective storage locations, respective portions of the file to retrieve includes determine portions of the file based at least in part on connection latency observed during retrieval from the respective storage locations.

Example 11 includes the computer-readable storage media of any of examples 1-6, wherein retrieve the respective portions includes request the respective portions of the file from the respective multiple storage locations and reassign a retrieval of a portion of the file from one storage location of the multiple storage locations to another storage location based at least in part on results of the request.

Example 12 includes the computer-readable storage media of example 11, wherein reassign a retrieval of a portion of the file from one storage location of the multiple storage locations to another storage location includes reassign the retrieval of a portion whose retrieval has timed out.

Example 13 includes the computer-readable storage media of example 11, wherein reassign a retrieval of a portion of the file from one storage location of the multiple storage locations to another storage location includes reassign the retrieval of a portion whose retrieval is performing more slowly than retrieval of other portions.

Example 14 includes the computer-readable storage media of example 11, wherein reassign a retrieval of a portion of the file from one storage location of the multiple storage locations to another storage location includes reassign the retrieval to a storage location for which retrievals have occurred more quickly than for other storage locations.

Example 15 includes the computer-readable storage media of example 11, wherein reassign a retrieval of a portion of the file from one storage location of the multiple storage locations to another storage location includes reassign the retrieval to a storage location for which no retrievals of portions of the file are currently occurring.

Example 16 includes the computer-readable storage media of any of examples 1-6, wherein the file is a segment of audio or video content.

Example 17 includes the computer-readable storage media of example 16, wherein the instructions are further to cause the computing device to present the retrieved portions of the file.

Example 18 includes the computer-readable storage media of example 16, wherein the instructions are further to cause the computing device to store the retrieved portions of the file.

Example 19 includes an apparatus for facilitating retrieval of a file stored at multiple storage locations. The apparatus includes one or more computing processors and a portion determination module. The portion determination module is to operate on the one or more computing processors to: receive an identifier of multiple storage locations from which a file can be retrieved, each of the multiple storage locations to store a copy of the file and determine, for respective storage locations, respective portions of the file to retrieve. The apparatus also includes a portion retrieval module to operate on the one or more computing processors to retrieve the respective portions of the file from the multiple storage locations.

Example 20 includes the apparatus of example 19, wherein the multiple storage locations include multiple content delivery networks.

Example 21 includes the apparatus of example 19, wherein the multiple storage locations include multiple servers at a single content delivery network.

Example 22 includes the apparatus storage media of example 19, wherein the multiple storage locations include connections to a single storage location.

Example 23 includes the apparatus of example 19, wherein receive an identifier of multiple storage locations includes receive an identifier including multiple uniform resource locators for the multiple storage locations.

Example 24 includes the apparatus of example 19, wherein determine, for respective storage locations, respective portions of the file to retrieve includes determine equally-sized portions of the file.

Example 25 includes the apparatus of any of examples 19-24, wherein determine, for respective storage locations, respective portions of the file to retrieve includes determine portions of the file based at least in part on a history of bandwidth observed for the multiple storage locations.

Example 26 includes the apparatus of example 25, wherein determine portions of the file based at least in part on a history of bandwidth observed for the multiple storage locations includes determine the sizes for the portions that are proportional to the bandwidth observed for the multiple storage locations.

Example 27 includes the apparatus of any of examples 19-24, wherein determine, for respective storage locations, respective portions of the file to retrieve includes determine portions of the file based at least in part on connection reliability observed during retrieval from the respective storage locations.

Example 28 includes the apparatus of any of examples 19-24, wherein determine, for respective storage locations, respective portions of the file to retrieve includes determine portions of the file based at least in part on connection latency observed during retrieval from the respective storage locations.

Example 29 includes the apparatus of any of examples 19-24, wherein retrieve the respective portions includes request the respective portions of the file from the respective multiple storage locations and re-assign a retrieval of a portion of the file from one storage location of the multiple storage locations to another storage location based at least in part on results of the request.

Example 30 includes the apparatus of example 29, wherein reassign a retrieval of a portion of the file from one storage location of the multiple storage locations to another storage location includes reassign the retrieval of a portion whose retrieval has timed out.

Example 31 includes the apparatus of example 29, wherein reassign a retrieval of a portion of the file from one storage location of the multiple storage locations to another storage location includes reassign the retrieval of a portion whose retrieval is performing more slowly than retrieval of other portions.

Example 32 includes the apparatus of example 29, wherein reassign a retrieval of a portion of the file from one storage location of the multiple storage locations to another storage location includes reassign the retrieval to a storage location for which retrievals have occurred more quickly than for other storage locations.

Example 33 includes the apparatus of example 29, wherein reassign a retrieval of a portion of the file from one storage location of the multiple storage locations to another storage location includes reassign the retrieval to a storage location for which no retrievals of portions of the file are currently occurring.

Example 34 includes the apparatus of any of examples 19-24, wherein the file is a segment of audio or video content.

Example 35 includes the apparatus of example 34, further including a presentation engine to present the retrieved portions of the file.

Example 36 includes the apparatus of example 34, further including a decoder to store the retrieved portions of the file.

Example 37 includes a computer-implemented method to facilitate retrieval of a file stored at multiple storage locations. The method includes: receiving, by a computing device, an identifier of multiple storage locations from which a file can be retrieved, each of the multiple storage locations to store a copy of the file; determining, by the computing device, for respective storage locations, respective portions of the file to retrieve; and retrieving, by the computing device, the respective portions of the file from the multiple storage locations.

Example 38 includes the method of example 37, wherein the multiple storage locations include multiple content delivery networks.

Example 39 includes the method of example 37, wherein the multiple storage locations include multiple servers at a single content delivery network.

Example 40 includes the method of example 37, wherein the multiple storage locations include connections to a single storage location.

Example 41 includes the method of example 37, wherein receiving an identifier of multiple storage locations includes receiving an identifier including multiple uniform resource locators for the multiple storage locations.

Example 42 includes the method of example 37, wherein determining, for respective storage locations, respective portions of the file to retrieve includes determining equally-sized portions of the file.

Example 43 includes the method of any of examples 37-42, wherein determining, for respective storage locations, respective portions of the file to retrieve includes determining portions of the file based at least in part on a history of bandwidth observed for the multiple storage locations.

Example 44 includes the method of example 43, wherein determining portions of the file based at least in part on a history of bandwidth observed for the multiple storage locations includes determining the sizes for the portions that are proportional to the bandwidth observed for the multiple storage locations.

Example 45 includes the method of any of examples 37-42, wherein determining, for respective storage locations, respective portions of the file to retrieve includes determining portions of the file based at least in part on connection reliability observed during retrieval from the respective storage locations.

Example 46 includes the method of any of examples 37-42, wherein determining, for respective storage locations, respective portions of the file to retrieve includes determining portions of the file based at least in part on connection latency observed during retrieval from the respective storage locations.

Example 47 includes the method of any of examples 37-42, wherein retrieving the respective portions includes requesting the respective portions of the file from the respective multiple storage locations and re-assigning a retrieval of a portion of the file from one storage location of the multiple storage locations to another storage location based at least in part on results of the request.

Example 48 includes the method of example 47, wherein reassigning a retrieval of a portion of the file from one storage location of the multiple storage locations to another storage location includes reassigning the retrieval of a portion whose retrieval has timed out.

Example 49 includes the method of example 47, wherein reassigning a retrieval of a portion of the file from one storage location of the multiple storage locations to another storage location includes reassigning the retrieval of a portion whose retrieval is performing more slowly than retrieval of other portions.

Example 50 includes the method of example 47, wherein reassigning a retrieval of a portion of the file from one storage location of the multiple storage locations to another storage location includes reassigning the retrieval to a storage location for which retrievals have occurred more quickly than for other storage locations.

Example 51 includes the method of example 47, wherein reassigning a retrieval of a portion of the file from one storage location of the multiple storage locations to another storage location includes reassigning the retrieval to a storage location for which no retrievals of portions of the file are currently occurring.

Example 52 includes the method of any of examples 37-42, wherein the file is a segment of audio or video content.

Example 53 includes the method of example 52, further including presenting, by the computing device, the retrieved portions of the file.

Example 54 includes the method of example 52, further including storing, by the computing device, the retrieved portions of the file.

Example 55 includes an apparatus to facilitate retrieval of a file stored at multiple storage locations. The apparatus includes: means for receiving an identifier of multiple storage locations from which a file can be retrieved, each of the multiple storage locations to store a copy of the file; means for determining, for respective storage locations, respective portions of the file to retrieve; and means for retrieving, the respective portions of the file from the multiple storage locations.

Example 56 includes the apparatus of example 55, wherein the multiple storage locations include multiple content delivery networks.

Example 57 includes the apparatus of example 55, wherein the multiple storage locations include multiple servers at a single content delivery network.

Example 58 includes the apparatus of example 55, wherein the multiple storage locations include connections to a single storage location.

Example 59 includes the apparatus of example 55, wherein means for receiving an identifier of multiple storage locations includes means for receiving an identifier including multiple uniform resource locators for the multiple storage locations.

Example 60 includes the apparatus of example 55, wherein means for determining, for respective storage locations, respective portions of the file to retrieve includes means for determining equally-sized portions of the file.

Example 61 includes the apparatus of any of examples 55-60, wherein means for determining, for respective storage locations, respective portions of the file to retrieve includes means for determining portions of the file based at least in part on a history of bandwidth observed for the multiple storage locations.

Example 62 includes the apparatus of example 61, wherein means for determining portions of the file based at least in part on a history of bandwidth observed for the multiple storage locations includes means for determining the sizes for the portions that are proportional to the bandwidth observed for the multiple storage locations.

Example 63 includes the apparatus of any of examples 55-60, wherein means for determining, for respective storage locations, respective portions of the file to retrieve includes means for determining portions of the file based at least in part on connection reliability observed during retrieval from the respective storage locations.

Example 64 includes the apparatus of any of examples 55-60, wherein means for determining, for respective storage locations, respective portions of the file to retrieve includes means for determining portions of the file based at least in part on connection latency observed during retrieval from the respective storage locations.

Example 65 includes the apparatus of any of examples 55-60, wherein means for retrieving the respective portions includes: means for requesting the respective portions of the file from the respective multiple storage locations; and means for re-assigning a retrieval of a portion of the file from one storage location of the multiple storage locations to another storage location based at least in part on results of the request.

Example 66 includes the apparatus of example 55, wherein means for reassigning a retrieval of a portion of the file from one storage location of the multiple storage locations to another storage location includes means for reassigning the retrieval of a portion whose retrieval has timed out.

Example 67 includes the apparatus of example 55, wherein means for reassigning a retrieval of a portion of the file from one storage location of the multiple storage locations to another storage location includes means for reassigning the retrieval of a portion whose retrieval is performing more slowly than retrieval of other portions.

Example 68 includes the apparatus of example 55, wherein means for reassigning a retrieval of a portion of the file from one storage location of the multiple storage locations to another storage location includes means for reassigning the retrieval to a storage location for which retrievals have occurred more quickly than for other storage locations.

Example 69 includes the apparatus of example 55, wherein means for reassigning a retrieval of a portion of the file from one storage location of the multiple storage locations to another storage location includes means for reassigning the retrieval to a storage location for which no retrievals of portions of the file are currently occurring.

Example 70 includes the apparatus of any of examples 55-60, wherein the file is a segment of audio or video content.

Example 71 includes the apparatus of example 70, further including means for presenting the retrieved portions of the file.

Example 72 includes the apparatus of example 70, further including means for storing the retrieved portions of the file.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable storage media comprising instructions to cause one or more computer devices, in response to execution of the instructions by the computer device, to:
   receive an identifier for each storage location of a plurality of storage locations from which a file can be retrieved, wherein each storage location is to store a copy of the file;
   determine individual portions of the file for retrieval from individual storage locations of the plurality of storage locations based at least in part on historical performance data of the individual storage locations, wherein the historical performance data is based on previously experienced connection conditions with the individual storage locations;
   determine sizes for the individual portions based at least in part on the previously experienced connection conditions of the individual storage locations indicated by the historical performance data;
   retrieve the individual portions of the file from the individual storage locations based on the determined sizes of the individual portions;
   observe current connection conditions with the individual storage locations while the individual portions are retrieved; and
   when performance of the current connection conditions drops below a threshold during retrieval of an individual portion of the individual portions, reassign retrieval of the individual portion from a corresponding one of the individual storage locations to another individual storage location.

2. The non-transitory computer-readable storage media of claim 1, wherein at least one of the individual storage locations comprises multiple content delivery networks.

3. The non-transitory computer-readable storage media of claim 1, wherein at least one of the individual storage locations comprise multiple servers at a single content delivery network.

4. The non-transitory computer-readable storage media of claim 1, wherein at least one of the individual storage locations comprise connections to a single storage location.

5. The non-transitory computer-readable storage media of claim 1, wherein to receive an identifier for each storage location, the computer device, in response to execution of the instructions by the computer device, is to receive an identifier comprising multiple uniform resource locators for each storage location.

6. The non-transitory computer-readable storage media of claim 1, wherein to determine the individual portions of the file to retrieve, the computer device, in response to execution of the instructions by the computer device, is to determine equally-sized portions of the file.

7. The non-transitory computer-readable storage media of claim 1, wherein to determine the individual portions of the file to retrieve, the computer device, in response to execution of the instructions by the computer device, is to determine different-sized portions of the file based at least in part on the historical performance data.

8. The non-transitory computer-readable storage media of claim 1, wherein to determine the individual portions of the file to retrieve, the computer device, in response to execution of the instructions by the computer device, is to determine the individual portions of the file based at least in part on connection reliability observed during retrieval from the respective storage locations.

9. The non-transitory computer-readable storage media of claim 1, wherein to determine the individual portions of the file to retrieve, the computer device, in response to execution of the instructions by the computer device, is to determine the individual portions of the file based at least in part on connection latency observed during retrieval from the respective storage locations.

10. The non-transitory computer-readable storage media of claim 1, wherein to retrieve the individual portions, the computer device, in response to execution of the instructions by the computer device, is to:
   request the individual portions of the file from corresponding ones of the individual storage locations.

11. The non-transitory computer-readable storage media of claim 1, wherein to reassign retrieval of the individual portion, the computer device, in response to execution of the instructions by the computer device, is to reassign the retrieval of an individual portion whose retrieval has timed out.

12. The non-transitory computer-readable storage media of claim 10, wherein to reassign retrieval of the individual portion, the computer device, in response to execution of the instructions by the computer device, is to reassign the retrieval of an individual portion whose retrieval is performing more slowly than retrieval of other individual portions.

13. The non-transitory computer-readable storage media of claim 10, wherein to reassign retrieval of the individual portion, the computer device, in response to execution of the instructions by the computer device, is to reassign the retrieval to an individual storage location for which retrievals have occurred more quickly than other individual storage locations.

14. The non-transitory computer-readable storage media of claim 10, wherein to reassign retrieval of the individual portion, the computer device, in response to execution of the instructions by the computer device, is to reassign the retrieval to an individual storage location for which no retrievals of individual portions of the file are currently occurring.

15. The non-transitory computer-readable storage media of claim 1, wherein the file is a segment of audio or video content.

16. An apparatus comprising:
one or more computer processors;
a portion determination module to operate on the one or more computer processors to:
receive an identifier for each storage location of a plurality of storage locations from which a file can be retrieved, wherein each of storage location is to store a copy of the file,
determine individual portions of the file for retrieval from individual storage locations of the plurality of storage locations, wherein the determination of the individual portions is based on historical performance data of the individual storage locations, wherein the historical performance data is based on previously experienced connection conditions with the individual storage locations, and
determine sizes for the individual portions based at least in part on the previously experienced connection conditions of the individual storage locations indicated by the historical performance data; and
a portion retrieval module to operate on the one or more computer processors to:
retrieve the individual portions of the file from the individual storage locations;
observe current connection conditions with the individual storage locations while the individual portions are retrieved; and
when performance of the current connection conditions drops below a threshold during retrieval of an individual portion of the individual portions, reassign retrieval of the individual portion from a corresponding one of the individual storage locations to another individual storage location.

17. The apparatus of claim 16, wherein the individual storage locations comprise one or more of multiple content delivery networks; a single content delivery network; and connections to a single storage location.

18. The apparatus of claim 16, wherein the historical performance data comprises a history of bandwidth observed for the individual storage locations, connection reliability observed during a previous retrieval from the individual storage locations, and connection latency observed during a previous retrieval from the individual storage locations.

19. The apparatus of claim 16, wherein to retrieve the individual portions, the portion retrieval module is to:
request the individual portions of the file from corresponding ones of the individual storage locations.

20. The apparatus of claim 16, wherein the performance of the current connection conditions drops below a threshold when retrieval of an individual portion from a corresponding storage location has timed out or whose retrieval is performed more slowly than retrieval of other individual portions.

21. A computer-implemented method, comprising:
receiving, by a computer device, an identifier for each storage location of a plurality of storage locations from which a file can be retrieved, where each storage location of the plurality of storage locations is to store a copy of the file;
determining, by the computer device, individual portions of the file for retrieval from individual storage locations of the plurality of storage locations based on historical performance data of the individual storage locations;
determining, by the computer device, sizes for the individual portions based at least in part on previously experienced connection conditions of the individual storage locations indicated by the historical performance data;
retrieving, by the computer device, the individual portions of the file from the individual storage locations;
determining current connection conditions with the individual storage locations while the individual portions are retrieved; and
when performance of the current connection conditions drops below a threshold during retrieval of an individual portion of the individual portions, reassigning, by the computer device, retrieval of the individual portion from a corresponding one of the individual storage locations to another individual storage location.

22. The method of claim 21, wherein the historical performance data comprises one or more of: a history of bandwidth observed for the individual storage locations, connection reliability observed during retrieval from the individual storage locations, and connection latency observed during retrieval from the individual storage locations.

23. The method of claim 21, wherein retrieving the individual portions comprises:
requesting the individual portions of the file from corresponding ones of the individual storage locations.

24. The method of claim 23, wherein the current connection conditions drop below the threshold when reassigning the retrieval of an individual portion times out or whose retrieval is performing more slowly than retrieval of other individual portions.

* * * * *

UNITED STATES PATENT AND TRADEMARK OFFICE
CERTIFICATE OF CORRECTION

PATENT NO. : 9,607,002 B2
APPLICATION NO. : 14/133480
DATED : March 28, 2017
INVENTOR(S) : Johannes P. Schmidt et al.

Page 1 of 1

It is certified that error appears in the above-identified patent and that said Letters Patent is hereby corrected as shown below:

In the Claims

Column 17
Line 36, "…each of storage location" should read - …each storage location…

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*